United States Patent [19]
Walker et al.

[11] 3,924,483
[45] Dec. 9, 1975

[54] BELT DRIVEN ACCESSORY FOR VEHICLES WITH AUTOMATIC BELT TENSIONER

[75] Inventors: Frank H. Walker, Grand Blanc; Larry D. Blumer, Swartz Creek; Robert N. Khouri; David G. Fulks, both of Flint, all of Mich.

[73] Assignee: General Motors Corporation, Detroit, Mich.

[22] Filed: Nov. 25, 1974

[21] Appl. No.: 526,515

[52] U.S. Cl. ................... 74/242.11 R; 74/242.15 R
[51] Int. Cl.² ........................ F16H 7/12; F16H 7/10
[58] Field of Search ............. 74/242.11 R, 242.15 R

[56] References Cited
UNITED STATES PATENTS

| | | |
|---|---|---|
| 3,430,507 | 3/1969 | Hurst et al. ................... 74/242.15 R |
| 3,473,399 | 10/1969 | Buchwald .................... 74/242.1 R X |
| 3,524,359 | 8/1970 | Buchwald ................. 74/242.11 R X |
| 3,631,734 | 1/1972 | Wagner ...................... 74/242.11 R |

*Primary Examiner*—Leonard H. Gerin
*Attorney, Agent, or Firm*—Charles R. White

[57] ABSTRACT

Belt driven accessories with pulleys supported thereon are pivotally anchored to a supporting bracket so that pivot pins provide reaction for the drive forces tensioning the tight side of driving belts. Spring means turn the accessories with respect to the pivot pins to vary the distance between drive and driven pulleys to provide tension in the loose sides of the belts so that accessories operate without excessive noise and at high efficiency regardless of belt wear and stretch.

4 Claims, 5 Drawing Figures

BELT DRIVEN ACCESSORY FOR VEHICLES WITH AUTOMATIC BELT TENSIONER

This invention relates to belt driven accessories for vehicles and more particularly to a new and improved tensioning construction which provides for the automatic and continuous tensioning of driving belts for accessories.

Vehicle accessories such as the power steering pump are frequently driven by a pulley fixed to the pump rotor. The pump pulley is a driven pulley which is rotated by a belt powered by a driving pulley secured to the engine crankshaft. Such belts have a tight side feeding from the driven pulley onto the driving pulley and a loose side feeding from the driving pulley onto the driven pulley. As the accessory load increases the tension of the tight side increases and the tight side often stretches in proportion to the load. With fixed centers between the drive and driven pulleys and with the belt stretched, the tension on the loose side decreases. To provide the necessary tension in such stretched belts to maintain efficient accessory operation, it is necessary to increase the center to center distance between the drive and driven pulleys.

Prior to the present invention belt driven accessories were often supported by special engine-mounted bracket assemblies which provided for the manual adjustment between the centers of drive and driven pulleys for drive belt installation and for belt tensioning purposes. In one prior art construction, a power steering pump is secured to an outer bracket which is pivotally secured to an engine mounted inner bracket. The pulley of the pump is adjusted relative to a driving pulley by pivoting the outer bracket relative to inner bracket to tension the driving belt operatively connecting the pulleys. Threaded fastener means extending from the outer bracket and from the pump housing through arcuate slot means in the inner bracket are employed to rigidly secure the brackets and the pump together to hold the belt in tension.

While such prior art constructions have generally been quite satisfactory considerable manual effort is often required to install and tension the driving belt. Also, once the centers of the drive and driven pulleys were fixed in position the belt loose side tension could decrease and adversely affect efficiency of accessory operation and require manual readjustment center to center distance to properly tension the driving belt.

This invention provides for the automatic and continuous maintenance of loose side tension of driving belts by varying the center to center distance of drive and driven pulleys regardless of belt wear or stretch. This invention incorporates spring means to provide the required force to pivot a first pulley with respect to an anchor pivot to vary the center distance of the first pulley relative to a fixed position second pulley to maintain the tension of the belt drivingly connecting the two pulleys.

In the preferred embodiment of this invention there is an engine mounted bracket on which one or more belt driven accessory are pivotally mounted. Each of the accessories has a driven pulley operatively mounted thereon so that the center to center distance between fixed position driving pulleys and the pulleys of the pivotally supported accessories can be varied to tension the driving belts operatively connecting the driving and driven pulleys. In this system the accessory being driven by the belt is pivotally mounted at a point sufficiently close to the line of action of the tight side of the belt to take substantially all of the reaction force when the belt is driven. Spring means are employed to turn the accessories on their pivots so that the loose side of the belt is tensioned. The moment about the pivot is established at any desired and nearly constant value of the spring which preferably is a torsion spring mounted at the pivot point. If desired a tension or compression spring could readily be used in place of the torsion spring.

A feature object and advantage of this invention is to provide a new and improved belt tensioning system for vehicle accessory drives which automatically maintains belt tension at a desirable level regardless of accessory load to minimize belt squeal or slippage.

Another feature, object and advantage of this invention is to provide a new and improved belt tensioning construction for vehicle accessory drives which automatically adjusts the center to center distance between drive and driven pulleys as the drive belt mounted thereon wears or stretches to continuously maintain adequate belt tension.

Another feature, object and advantage is to provide a new and improved belt tensioning construction for vehicle accessory drives in which first pulley means drives second pulley means by drive belt means and the second pulley means is pivotally anchored to a support near the tight side line of action of the drive belt means to provide reaction for belt tensioning forces on the tight side of the belt. Spring means are employed to pivot the second pulley with respect to the anchor pivot to vary the center to center distance between pulleys to maintain proper tension in the loose side of the belt.

Another feature, object and advantage of this invention is to provide a new and improved belt tensioning construction for belt driven vehicle accessories that facilitates installation of driving belts on drive and driven pulley means, that continuously provides proper belt tensioning regardless of belt stretch and wear so that belt service life is improved and accessories are operated with greater efficiency.

These and other features, objects and advantages of this invention will become more apparent from the following detailed description and drawing in which.

Figure 1:
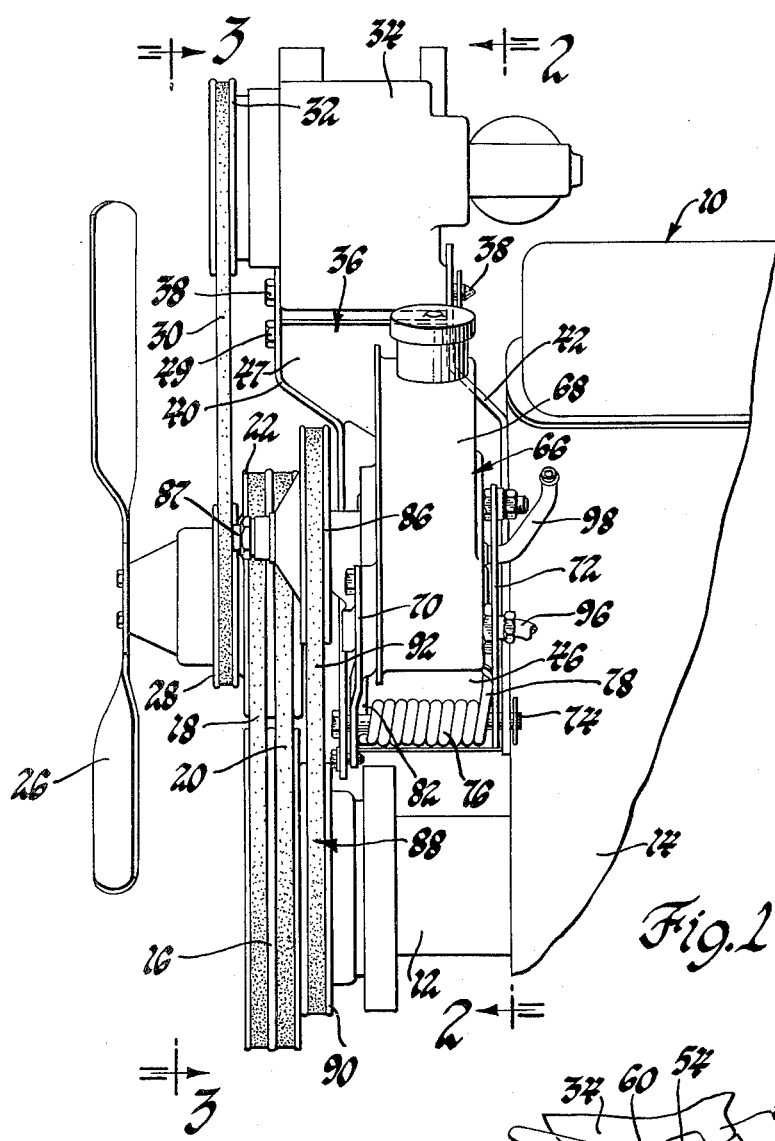
FIG. 1 is a side elevational view of a portion of an internal combustion engine and belt driven accessories illustrating this invention.
Figure 2:
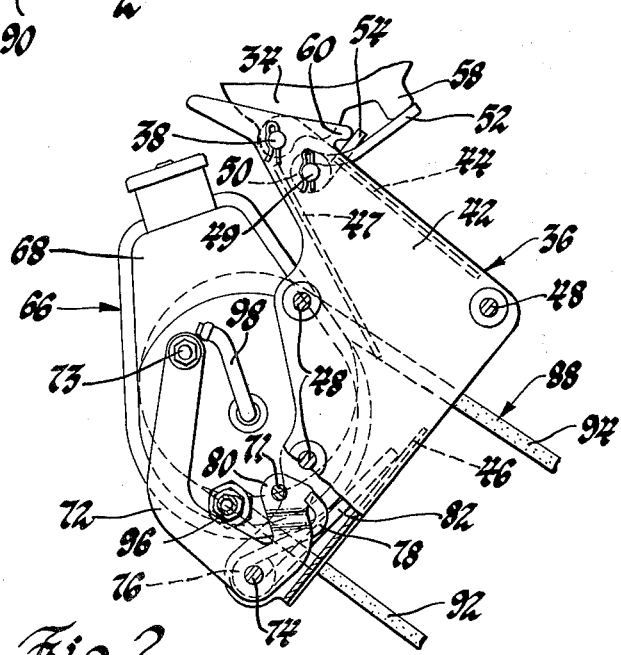
FIG. 2 is a view taken generally along line 2—2 of FIG. 1.
Figure 3:
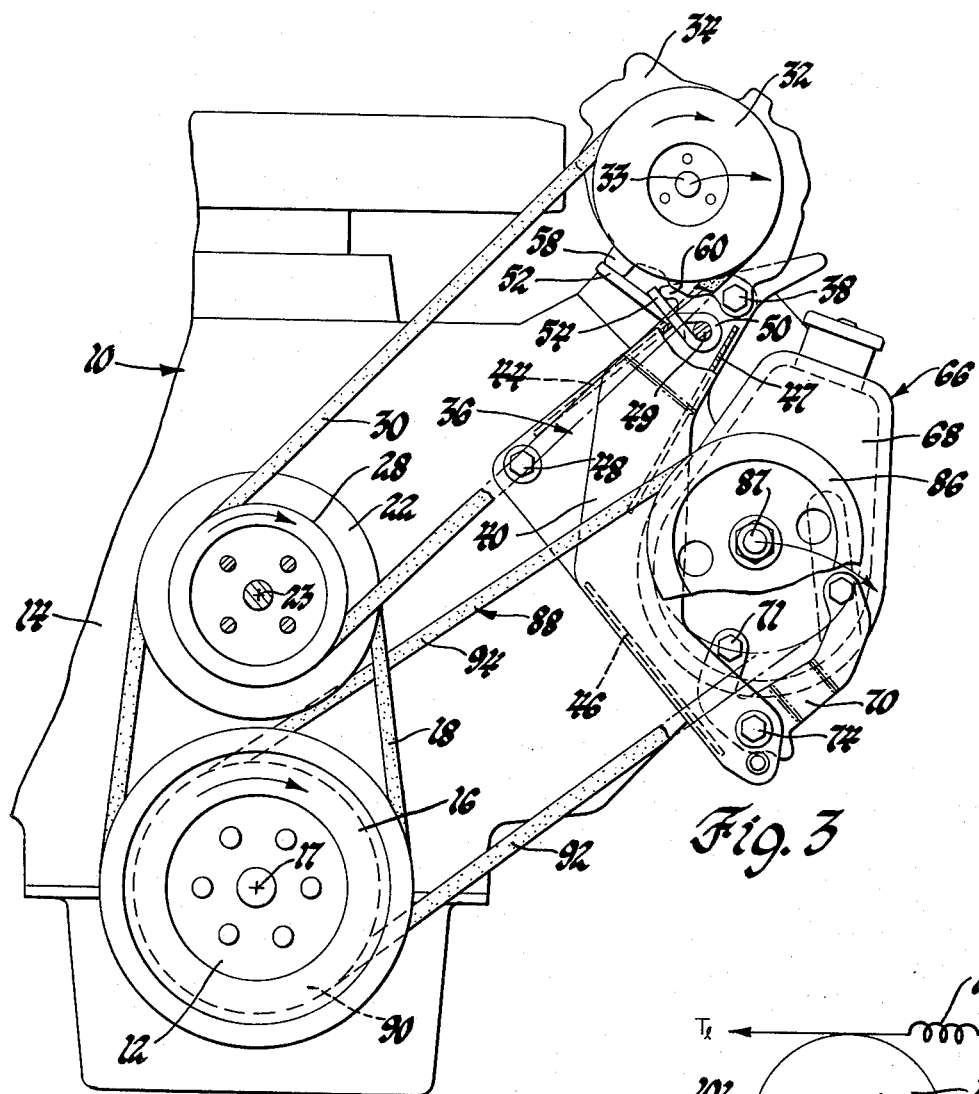
FIG. 3 is a view taken generally along lines 3—3 of FIG. 1.

Turning now to the details of the drawings there is shown an internal combustion engine 10 having a crankshaft 12 extending from the front of engine block 14 for rotatably driving a drive pulley 16 secured thereto in a clockwise direction about axis 17 as indicated by the directional arrow shown in FIG. 3. A pair of drive belts 18 and 20 mounted on pulley 16 rotatably drives a water pump and fan pulley assembly 22 mounted for rotation about axis 23 on the front of the engine block 14 immediately above the drive pulley 16. By this construction, fan 26 and a water pump rotor internal of the engine block are rotatably driven. The water pump and fan pulley assembly includes a small diameter drive pulley 28 secured thereto between the fan 26 and the pulley assembly 22 which drives an air pump belt 30.

As shown belt 30 drives a pulley 32 secured to the rotatable drive shaft 33 of an air pump 34. The air pump 34 is in turn pivotally mounted on a bracket assembly 36 by pivot pin 38. The bracket assembly 36 is rigidly secured to the front of the engine block and comprises front and rear plates 40 and 42, generally L-shaped, which are interconnected by flat plates 44, 46 and 47. Threaded fastener means 48 extending through suitable openings in the rear plate 42 are threaded into openings in the front of the engine block to secure the bracket assembly to the engine block. A pin 49 just below pin 38 extends through the coils of an upper torsion spring 50 and through the front and rear plates of the bracket assembly to mount the torsion spring on the bracket assembly. The torsion spring has extending end portions 52 and 54 extending from opposite end coils thereof which respectively engage a contact 58 projecting from the pump assembly and an upper extension 60 of the rear bracket plate 42. This torsion spring turns the air pump assembly in a clockwise direction with respect to pivot pin 38 as shown by the directional arrow in FIG. 3 to tension the belt 30 by a predetermined spring force as will be explained in greater detail below. It will be noted that the pivot pin 38 is close to the line of action of the tight side of the belt 30 and provides a reaction to the forces tensioning the tight side of this belt when it is driven by pulley 28.

In addition to supporting the air pump assembly, the bracket assembly 36 further supports a power steering pump assembly 66. As shown the pump assembly 66 has a pump body 68 with support arms 70 and 72 rigidly secured to each side thereof by threaded fasteners 71 and 73. A pin 74 extending through the bracket plates 40 and 42 and the support arms 70 and 72 mounts the pump assembly for turning movement with respect to the bracket assembly. The pin 74 also extends through the coils of a torsion spring 76 which has one end 78 hooked around an end portion 80 of support arm 72 and a second end 82 grounded on the bottom plate 46. This torsion spring provides a force to turn the pump assembly clockwise with respect to pin 74 as shown by the directional arrow in FIG. 3.

The pump assembly 66 includes a front pulley 86 mounted on rotatable shaft 87. A driving belt 88 is operatively mounted on front pulley 86 and on a drive pulley 90 secured to the engine crankshaft 12 inboard of pulley 16.

In operation the accessory air pump 34 and power steering pump 66 are simultaneously driven by the engine crankshaft when the engine is fired. As the accessory load increases, such as when the power steering gear is activated to negotiate a turn, the tension of the tight side 92 of the belt 88 increases. This causes the tight side to stretch and thereby decrease the tension on the loose side 94 of the belt.

In the present invention the torsion spring 76 maintains loose side tension by turning the entire pump assembly 66 on pivot pin 74 in a direction to increase the variable center distance between pulleys 90 and 86 and thereby tension the loose side 94 of the belt 88. Since the pivot pin 74 is anchored near the line of action of the tight side 92 of belt 88, pivot pin 74 provides reaction for the tight side of the belt 88. With the moment about the pivot pin established by the torsion spring 76, the tension of the loose side of the belt is established. The spring is selected to ensure that an optimum tension is continuously maintained. With the pivot pin 74 slightly offset from the tight side of the belt, the tension in the loose side slightly decreases as the torque increases.

With the loose side tension established by the spring 76 the pump assembly will be driven by belt 88 with little or no slippage in spite of any belt wear or stretch. Under such conditions the pump assembly operates at high efficiency to supply the power steering gear with operating fluid through pressure hose assembly 96. A second hose assembly 98 is a return which feeds fluid to the pump assembly from a sump not shown.

In a manner similar to that described in connection with the power steering pump assembly, the tension in the loose side of the air pump belt 30 is maintained by torsion spring 50. Under such conditions the air pump 34 pumps air into the exhaust manifold so that exhaust pollutants will be oxidized.

Figure 4:
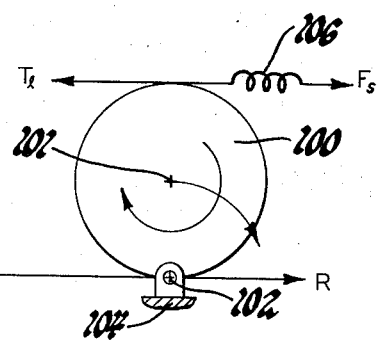
FIG. 4 is a diagrammatic view of a second embodiment of this invention.
Figure 5:
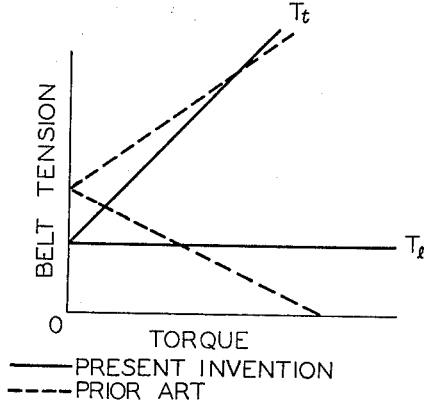
FIG. 5 is a diagram of curves illustrating operation of the embodiment of FIG. 4 and operation of prior art construction.

While the pivot pins 38 and 74 are shown as being slightly offset from the tight side of their respective belts they may be directly aligned therewith so that loose side belt tension is a constant value established by the torsion springs and will not vary with increasing torque or accessory load. This feature is illustrated in FIGS. 4 and 5. In the FIG. 4 construction pulley 100 corresponds to pulley 86 of FIG. 3 and is rotatably driven about axis 101 by a flexible belt such as belt 88. In this embodiment the pulley is anchored by a pivot 102 in alignment with the tight side of the driving belt. The pivot 102 is supported on a base 104 which corresponds to bracket assembly 36. Spring 106 operatively connected to the pulley via the pump body biases the pulley in a clockwise direction in viewing FIG. 4 to maintain a predetermined tension in the loose side of the belt. The vector $T_t$ represents the tension of the tight side of the belt. Vector R is the reaction force. With this construction the entire tight side reaction is provided by the pivot 102 so that loose side tension $T_1$ is established by the force $F_s$ of spring 106. FIG. 5 shows operation of the FIG. 4 design and compares it with prior art construction in which the center to center pulley distance is fixed on initial assembly but may be varied by a manual adjustment. In the present invention the tension $T_1$ of the loose side of the belt remains constant as accessory load or tight side tension $T_t$ increases as shown by the full line curves. In the prior art device illustrated by the dashed line curves the loose side tension rapidly decreases to zero as the tight side tension increases and stretches the belt. Such prior art constructions have belt squeal and slippage and detract from vehicle accessory operation.

While a preferred embodiment of this invention has been shown and described in detail to illustrate the invention, various changes and modifications may be made without departing from the scope of the invention set forth in the following claims.

We claim:

1. A drive system for vehicle accessories comprising first pulley means rotatably mounted in a predetermined position in a vehicle, motor means, means drivingly connecting said motor means to said first pulley means, an accessory, support means in the vehicle for said accessory, pivot means mounting said accessory for limited turning movement on said support means, second pulley means drivingly connected to said accessory and secured thereto for turning movement with said accessory on said pivot means, flexible drive belt means operatively mounted on said first and second pulley means to permit said first pulley means to drive said second pulley means, said belt means having a tight side feeding from said second pulley means onto said first pulley means and further having a loose side feeding from said first pulley means onto said second pulley means, said pivot means being positioned relative to said tight side of said belt means to provide a reaction to the force exerted by said tight side of said belt means when driven by said first pulley means, and spring means operatively connected to said accessory for automatically turning said accessory so that said center of said second pulley means is yieldably urged from the center of said first pulley means to tension said loose side of said belt means for all torque loads of said accessory.

2. In a vehicle, a drive system for vehicle accessories comprising first pulley means rotatably mounted in a predetermined position in said vehicle, motor means for moving said vehicle means drivingly connecting said motor means to said first pulley means, an accessory, support means for said accessory, pivot means mounting said accessory for turning movement on said support means, second pulley means drivingly connected to said accessory and secured thereto for turning movement with said accessory on said support means with respect to said pivot means, flexible drive belt means operatively mounted on said first and second pulley means to permit said first pulley means to drive said second pulley means and thereby drive said accessory, said belt means having a tight side feeding from said second pulley means onto said first pulley means and further having a loose side feeding from said first pulley means onto said second pulley means, said pivot means being positioned closely adjacent to said tight side of said belt to provide the reaction to the force exerted by said tight side of said belt when driven by said first pulley means, and spring means operatively connected to said accessory for automatically turning said accessory and said second pulley means on said pivot means so that said center of said second pulley means is moved away from the center of said first pulley means in response to wear and stretch of said belt means to thereby tension said loose side of said belt means for all torque loads of said accessory.

3. In a vehicle, a drive system for accessories carried by said vehicle comprising rotatable first pulley means rotatably mounted in a predetermined position in said vehicle, motor means for developing power for moving said vehicle, said motor means having a crankshaft for driving said first pulley means, said vehicle having rotatable fluid pump means, stationary support means in said vehicle for supporting said pump means, pivot means mounting said pump means for turning movement on said support means, second pulley means drivingly connected to said pump means and secured thereto for turning movement with said accessory on said support means, flexible drive belt means operatively mounted on said first and second pulley means to permit said first pulley means to drive said second pulley means, said belt means having a tight side feeding from said second pulley means onto said first pulley means and further having a loose side feeding from said first pulley means onto said second pulley means, said pivot means of said pump means being aligned with said tight side of said belt means provide a reaction force equal in magnitude and opposite to the stress applied to the tight side of said belt means and torsion spring means operatively disposed around said pivot means and operatively connected to said pump means for automatically turning said pump means and said second pulley means so that said center of said second pulley means is urged away from that of said first pulley means for maintaining a constant tension in said loose side of said belt means for all torque loads of said pump means.

4. In a vehicle, first and second accessories for said vehicle, a drive system for said accessories comprising motor means for developing power for moving said vehicle and driving said accessories, said motor means having a rotatable crankshaft, first pulley means mounted on said crankshaft for rotation therewith, a bracket secured to said motor means for supporting said first and second accessories, each of said accessories having a rotatable pulley secured thereto which rotatably drive said accessories, pivot anchor means for pivotally mounting each of said accessories to said bracket, first and second belt means drivingly connecting said pulley means of each said accessories to said first pulley means, each of said belt means having a tight side and a loose side, torsion spring means for each of said accessories for urging said accessories in a direction to maintain the loose side tension of each of said belt means in response to an increasing load from said accessories on the tight side of each of said belt means causing said belt means to stretch.

* * * * *